Aug. 31, 1954 O. K. KELLEY 2,687,616
ROTARY HYDRAULIC TORQUE CONVERTER
Filed Jan. 11, 1949 2 Sheets-Sheet 2
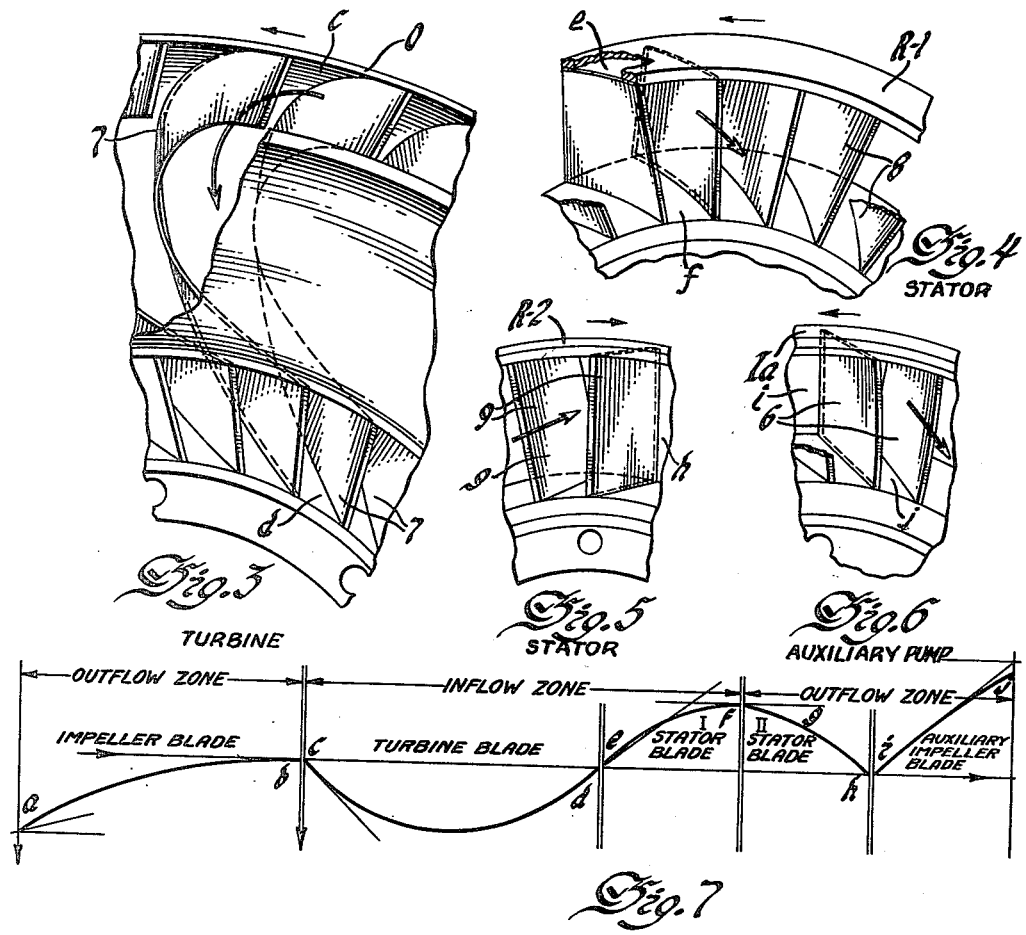
Inventor
Oliver K. Kelley
By
Spencer, Willits, Helmig & Baillio
Attorneys Patented Aug. 31, 1954

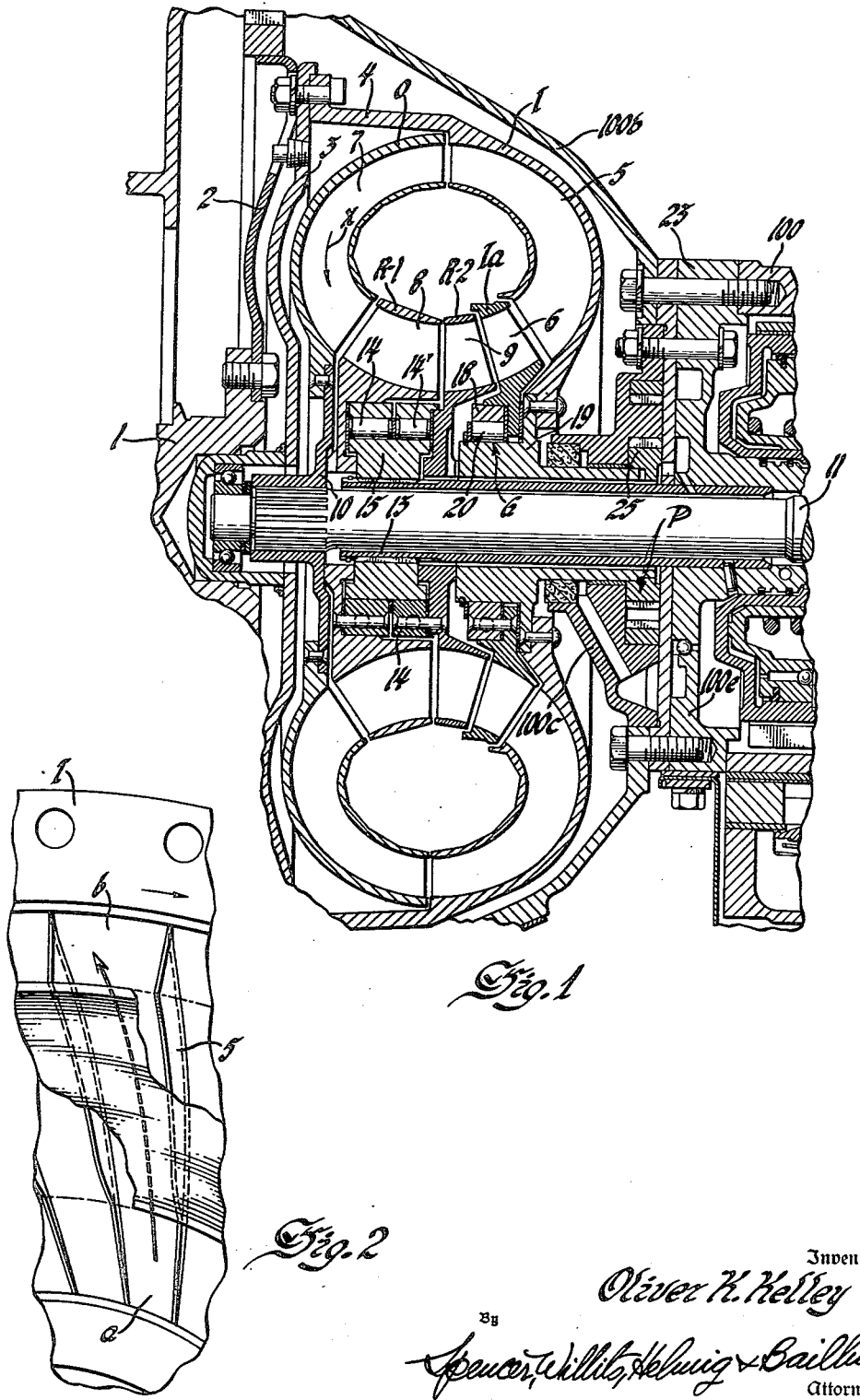

2,687,616

UNITED STATES PATENT OFFICE 2,687,616

ROTARY HYDRAULIC TORQUE CONVERTER

Oliver K. Kelley, Birmingham, Mich., assignor to General Motors Corporation, Detroit, Mich., a corporation of Delaware Application January 11, 1949, Serial No. 70,175

12 Claims. (Cl. 60—54)

The present invention relates to fluid torque converters for driving automobiles. It is especially directed to the structure and arrangement of the blades or vanes of such torque converters which improves the efficiency of the torque converter.

Furthermore, it is specifically directed to a particular sequence of inlet and exit blade angles by which the impact or shock losses customarily encountered in fluid turbine torque converters are reduced, resulting in a reduction of power lost as heat.

The present is a continuation-in-part of the applicant's applications for Letters Patent Serial No. 565,592, filed November 29, 1944, now Patent No. 2,606,460, issued August 12, 1952, and Serial No. 790,950, filed December 11, 1947, for improvements in "Combined Transmission," and "Multiple Stage Torque Converter," respectively.

The terms "toroidal flow," "toroidal velocity," "circulatory velocity" or "circulatory flow" are used in this text to describe the fluid flow around the core-ring sectional portion of the turbine, as distinct from the circumferential flow around the converter centerline. Some authors name this circulatory flow "vortical" or "vortex." The applicant is believed to be using these terms in a manner well-understood in this art.

In the drawings,

Fig. 1 is a vertical section of one form of torque converter embodying the invention;

Fig. 2 is a fragmentary elevation of the impeller as seen looking into its open face from the left of Fig. 1;

Fig. 3 is a view similar to Fig. 2 looking into the open face of the turbine from the right of Fig. 1;

Fig. 4 is a corresponding fragmentary elevation of the first reactor R–1, as seen from the right of Fig. 1;

Fig. 5 is a fragmentary elevation of the second reactor R–2, as seen from the left of Fig. 1;

Fig. 6 is a fragmentary elevation of the auxiliary impeller, as seen from the right of Fig. 1.

Figure 7 is a diagram of the blade angles of the assembly of Fig. 1 referred to the line of flow of the circulating liquid and the normal hand of rotation.

In Fig. 1 a typical drive arrangement embodying the invention is shown. Engine shaft 1 drives the flywheel web 3 thru spring disc 2 bolted thru to drum 4 integral with the impeller I, the inner radial portion of which is riveted to the hub piece 19 supported in the webs of the casings 100, 100b and driving the primary gear 25 of pump P. The outer face of hub piece 19 is the inner race of a 1-way clutch G, the rollers 20 coacting with cam ring 18 attached to the auxiliary impeller Ia. The right half of the converter is the fluid outflow zone and the left half, the inflow zone.

The turbine rotor O is riveted to the flange of hub 10 splined on output shaft 11. The first reactor or stator R–1 is equipped with 1-way clutch 14, and the second stator R–2 with 1-way clutch 14', the inner piece 15 being splined to sleeve 13 fixed to web 23 of the casing 100c—100e.

The impeller or pump I is bladed at 5, the turbine O has blades 7, the first stator R–1 has blades 8, the second stator R–2 blades 9 and the auxiliary impeller has blades 6.

The rotation of impeller I in the right half of the assembly, in the outflow zone, develops kinetic energy in the working space in which lie the blades 5, 6, 7, 8, 9, the turbine O in the inflow zone to the left, extracting a portion of that energy, the gyratory or toroidal flow counter-clockwise as indicated by arrow X being initially high when turbine O is at standstill.

Rotation of impeller I circulating the fluid in the direction of the arrow, to transmit variable torque to rotor O, thereby couples engine shaft 1 to output shaft 11 at variable speed ratios. Initial rotation of impeller I under load creates the high velocity circulation in the direction of the arrow, which exerts reverse or locking torque on both stators R–1 and R–2 and causes auxiliary impeller Ia to spin forwardly faster than I.

Eventually the backward torque on stator R–1 diminishes to zero and the exit stream from O on the back portions of the R–1 blades turns the reactor forward. This action also occurs with respect to stator R–2 somewhat later.

In order to keep the cumulative shock losses low, for best efficiency over an extended speed ratio range, the present invention utilizes in addition to the two successive stators or reaction members R–1 and R–2, plural impellers composed of two successive bladed wheels, one an auxiliary impeller Ia being permitted to run forward faster than the main impeller I by 1-way clutch G.

The shock losses are high when the turbine is stationary, fall off toward zero at some speed and rise again to a predetermined value, and finally again fall off toward zero as speed progressively increases.

This process may be visualized if one conceives of a blade and a controlled stream of oil which first impinges on one side of the blade, later impinges head-on and then impinges on the other face of the blade. Between impinging on opposite blade faces, the shock loss measurably falls off toward zero, and if the direction of stream impingement alternates between the faces, the shock loss becomes approximately zero some time during each shift. Increase of shock loss is generally proportional to deviation from the zero angle of entry or impingement.

The engine-driven impeller I of Fig. 1 imparts a forward whirl about the axis to the fluid, and at stall, the standing turbine member O converts this to a backward whirl at the exit of the turbine.

Within a predetermined speed range established by the blade angles, the backward whirl provided by the driven turbine O becomes less with rise of turbine speed, and eventually becomes a forward whirl of less velocity than that of the impeller I.

Now with a reaction rotor R in the circuit, the backward flow from the turbine blading 7 is changed by the form of the reaction blades 8 and 9 to a forward flow on entering the impeller.

It will be understood, therefore, that the reaction blades, 8, 9 provide the greatest change of direction at stall, and that as the output turbine speed rises, the reaction wheels change direction of the oil less and less until a point is reached when oil strikes the back of the reaction blades.

At that point, the reaction rotor R would cease to be of any use, and actually would create flow loss, since it lies in the working space path between the turbine outlet and the inlet zone of the impeller I. For this reason the reactor is allowed to spin forwardly.

Long study of the change of velocity between reaction wheel and impeller has taught the applicant that a single fixed impeller entry angle does not permit effective transfer of the fluid at this point, with low shock losses over a wide speed range.

For these reasons, the applicant provides the auxiliary impeller member Ia between the exit of the reaction wheel R-2 and the entry of the main impeller I.

This auxiliary impeller Ia is provided with the unit G, a 1-way clutch 18—19—20 coupling it to the main impeller I so that the auxiliary impeller blades 6 may rotate forwardly faster, but never slower than the main impeller blades 5.

When the toroidal flow velocity diminishes, the auxiliary impeller speed falls until it is equal to that of the main impeller I, and thereafter during lower velocities, is driven by the 1-way clutch 18—19—20 with the main impeller I. The blade angles of the auxiliary impeller are such that flow into the auxiliary impeller occurs with low shock loss at low toroidal velocity, whereas the auxiliary impeller Ia may run away at the higher velocities.

For clearer understanding of these varying conditions, phase I may be taken for the stall condition when the reaction members R-1, R-2 are both stationary, and when the auxiliary impeller Ia is running faster than the main impeller I. Circulatory velocity is high when the turbine O stands still, but diminishes with rise of turbine speed. At a predetermined speed, the auxiliary impeller Ia falls off to the speed of the main impeller I. The shock losses thereupon diminish.

In phase II the impellers I and Ia are at the same speed, and the turbine O is driven with torque multiplication as in any other converter, over its designed range.

Rise of speed of turbine O coincides with a fall of the torque reaction force tending to turn the reaction members R-1, R-2 backward. The first reaction wheel R-1 is arranged to have its reaction force diminish first, and when this force reaches zero, phase II ends.

To this point, the first stator wheel R-1 has been supplied with oil having a high angle of discharge from the turbine O, during the period of high circulatory velocity. The tangential velocity of oil leaving the turbine has steadily diminished during acceleration.

During this process, the reaction rotor vanes 8 have been struck by the flow from the turbine O, first on their concave faces, and later on the convex faces. At the shift-over point, the shock or turbulence at the edges of the reactor blades fell to about zero, as noted above. At the end of this period, the reaction wheel R-1 could idle or freewheel forwardly, with low shock losses.

Phase III begins when the first stator R-1 starts forward rotation, and ends when the reaction torque of the second reactor R-2 falls to zero. This stator is free to freewheel thereafter in the final or coupling phase when all of the bladed wheels are rotating.

It seems advisable to provide illustrative data on torque ratios, relative speeds, flow velocities and associated factors so that it will be wholly clear how the shock losses are reduced in practise by my invention.

I prefer to use the following blade-angle limits:

|  | Inlet | Exit |
| --- | --- | --- |
| Aux. Impeller | 35–45 | 35–45. |
| Main Impeller | 15–20 | –10 to plus 10. |
| Turbine Member | 40–50 | 50–60. |
| First Stator | 35–40 | 2–8. |
| Second Stator | 20–30 | 35–45. |

Results of units falling within these limits have been uniformly satisfactory.

One example is:

|  | Blade Angles (degrees) | | Blades |
| --- | --- | --- | --- |
|  | Inlet | Outlet |  |
| Aux. Impeller—Ia | 40.35 | 37.68 | 6 |
| Main Impeller—I | 16.7 | 0 | 5 |
| Turbine Rotor—O | 45.57 | 56.32 | 7 |
| First Stator—R-1 | 38.67 | 5.71 | 8 |
| Second Stator—R-2 | 24.23 | 42. | 9 |

The Figures 2 to 6 are facing views of the impeller I, turbine O, stators R-1 and R-2, viewed from between the stators and the auxiliary impeller Ia viewed from the main impeller, in that sequence, the arrows in the blade spaces indicating direction of flow. The circumferential arrows indicate the rotation hand of each of the bladed wheels.

These views are derived from physical parts of the construction of the example, and may be clearly understood by reference to the line diagram of Fig. 7 showing the blade angles of the rotor members.

When the impeller rotates the fluid is lifted from the inlet portion of the pump in Fig. 2, at $a$ to the exit $b$, the latter being displaced rotationally backward from the entrance, this type of blade arrangement resembling the trailing or backward-inclined blading of centrifugal pumps, the fluid leaving the impeller axially at $b$, at zero or axial blade angle.

In Fig. 3 the fluid mass enters the turbine inlet at $c$ and its energy is absorbed by the load-connected turbine O as the fluid mass moves inward in the inflow zone to $d$. It will be noted that the portion of the blade at inlet c is located angularly and forwardly with respect to the exit portion d, the velocity of the fluid emerging at d having a backward tangential component.

The fluid mass in Fig. 4 is delivered from the turbine exit d to the first stator inlet area e and the stream is redirected from a large inlet angle of approximately 39 degrees to a slight exit angle at point f of about 6 degrees, within the first stator blades 8.

This process may be better visualized by reference to Fig. 7.

In Fig. 5 the second stator blades accept the fluid mass from the blades 8 of the first stator, at an angle of about 24 degrees at entry g and redirect the stream out exit h at approximately 42 degrees to the axis and into inlet i of the auxiliary impeller Ia of Fig. 6, the blades 6 having an inlet angle of approximately 40 degrees and an exit angle of about 37 degrees, which means that the blades 6 of rotor Ia are nearly flat.

One advantage of my invention is that the blade thickness is less than in comparative devices in this art. Previous blades of heavy section and tear-drop or bulbous contour can be eliminated when the features herein described are provided for avoidance of the shock losses, and a structure built in accordance may utilize relatively thin blades of only sufficient body to sustain the load. Furthermore, the device of the invention may be commercially produced with inexpensive sheet metal, instead of by more costly casting processes.

The diagram of Fig. 7 is a representation of the blade angles of the foregoing table taken by reference of each of the blade groups of the five elements from a plane intersecting the axis of rotation. It will be noted that the horizontal arrow designates the general direction of flow, and the vertical arrow indicates the direction of rotation. The diagram is only explanatory to aid in visualizing the relative blade angles.

What I therefore claim and desire to secure by Letters Patent hereunder is:

1. A fluid torque converter for coupling power and load shafts at varying torque ratios comprising a plurality of bladed rotor members which include a fluid working space within their bladed portions divided into two flow zones providing outward and inward radial flow of the body of fluid of the working space, said plurality of rotor members including a rotatable power-connected impeller main member in the said outflow zone bladed to impart kinetic energy to the said fluid body and deliver same to a rotatable, load-connected turbine member located in the said inflow zone bladed to receive the fluid body from the said impeller at the outermost portion of said space, and at one energy value, and to discharge the fluid body radially inward at another, lesser energy value, a pair of cooperating reaction stator members located to receive the fluid from said turbine sequentially, one of which stators is located in the innermost radial portion of said inflow zone and the other in a similar portion of said outflow zone, an auxiliary impeller member next adjacent said latter-named stator in the outflow zone and adapted to receive the fluid body from the second of said stator members and guide same radially outward to the inlet of said first-named impeller member, and a one-way coupling having locking elements arranged to disconnect the auxiliary impeller member from the said main impeller member during given differential speeds of said shafts when said powershaft speed is substantially higher than that of said load shaft and the circulating fluid velocity of said fluid body in said inflow and outflow zones is above a predetermined velocity, such that the said auxiliary impeller member rotates forwardly faster than the main impeller member.

2. A fluid torque converter for coupling power and load shafts at varying torque ratios comprising a plurality of bladed rotor members which include a fluid working space within their bladed portions divided into two flow zones providing outward and inward radial flow of the body of fluid of the working space, said plurality of rotor members including a rotatable power-connected impeller main member in the said outflow zone bladed to impart kinetic energy to the said fluid body and deliver same to a rotatable, load-connected turbine member located in the said inflow zone bladed to receive the fluid body from the said impeller at one energy value and discharge same radially inward at another, lesser energy value, a pair of cooperating reaction stator members located sequentially to receive the fluid from said turbine, one of which stators is located in the inner radial portion of said inflow zone and the other in the inner radial portion of said outflow zone, an auxiliary impeller member in the outflow zone adapted to receive the fluid from said stator members and guide same to the inlet of said first-named impeller member, a one-way coupling arranged to disconnect the auxiliary impeller member from the said main impeller member during given differential speeds of said shafts when said power space shaft speed is substantially higher than that of said load shaft and the circulating velocity of said fluid body in said outflow and inflow zones is above a predetermined velocity, such that the said auxiliary impeller member rotates forwardly faster than the main impeller member, and a blading arrangement for said main impeller member wherein the impeller blades are disposed to a plane separating said outflow and inflow zones at their outer radial exit portions at an exit angle of zero degrees and having an inlet angle at their inner radial portions between fifteen and twenty degrees, said inlet portions being circumferentially displaced in advance of said exit portions.

3. A fluid torque converter for coupling power and load shafts at varying torque ratios comprising a plurality of bladed rotor members which include a fluid working space within their bladed portions divided into two flow zones providing outward and inward radial flow of the body of fluid of the working space, said plurality of rotor members including a rotatable power-connected impeller main member in the said outflow zone bladed to impart kinetic energy to the said fluid body and deliver same to a rotatable, load-connected turbine member located in the said inflow zone bladed to receive the fluid body from the said impeller at one energy value and discharge same radially inward at another, lesser energy value, a pair of cooperating reaction stator members located sequentially to receive the fluid from said turbine, one of which stators is located in the inner radial portion of said inflow zone and the other in the inner radial portion of said outflow zone, an auxiliary impeller member in the outflow zone adapted to receive the fluid from said stator members and guide same to the inlet of said first-named impeller member, a one-way coupling arranged to disconnect the auxiliary impeller member from the said main impeller member during given differential speeds of said shafts when said power space shaft speed is substantially higher than that of said load shaft and the circulating velocity of said fluid body in said outflow and inflow zones is above a predetermined velocity, such that the said auxiliary impeller member rotates forwardly faster than the main impeller member, and an arrangement of the blades of said main impeller member in which their inner radial entry portions are set at an angle of fifteen to twenty degrees with exit angles at their outer radial portions of approximately zero degrees, of said turbine member having blades with inlet angles at their outer radial portions of between forty and fifty degrees and exit angles at their inner radial portions of between fifty and sixty degrees, and of the inlet portions of said impeller blades being located circumferentially forward of their exit portions, and of the inlet portions of said turbine blades being circumferentially forward of their exit portions.

4. In the combination set forth in claim 1, the sub-combination of said first stator member blades being located in the inflow zone radially inward of said turbine member blades and having inlet angles of between thirty-five and forty degrees and exit angles of between two and eight degrees, of said second stator member being located in the said outflow zone and having inlet blade angles of between twenty and thirty degrees with exit angles of between thirty-five and forty-five degrees such that under a diminishing backward torque component, the said first stator member is capable of forward rotation prior to said second stator member under normal acceleration of said load shaft.

5. A fluid turbine torque converter comprising a plurality of rotor members enclosing a fluid toroidal working space, blades on each of said members all relatively rotatable within said space, a body of fluid circulating in said space, an impeller member with blades having inlet angles between fifteen and twenty degrees and zero outlet angles, a driven turbine member adjacent said impeller member with blades having inlet angles between forty and fifty degrees and exit angles between fifty and sixty degrees, a first reactor member adjacent said turbine member adapted to operate as a stator under high fluid toroidal velocity within said space and to idle forwardly under lower toroidal velocity therein, the said reactor member blades having inlet angles of between thirty-five and forty-five degrees and exit angles between zero and ten degrees, a second reactor member likewise adapted to operate independently as a stator member under high fluid toroidal velocity within said space and to idle forwardly under a different lower toroidal velocity than that of said first-named reaction member, the said second reactor member blades having inlet angles of between twenty and thirty degrees and exit angles between thirty-five and fifty degrees, and an auxiliary impeller located within said space for receiving the fluid from said second reactor member and delivering same to said first-named impeller, said auxiliary impeller having blades with inlet angles of between thirty-five and forty-five degrees for the purpose of rotating faster than said impeller at predetermined toroidal velocity of said fluid body.

6. In the combination recited in claim 5, the sub-combination of a 1-way clutch connecting said impeller member and said auxiliary impeller member operative to permit the latter member to rotate forward faster than the first-named impeller member during intervals when the said toroidal velocity of said fluid body is higher than a predetermined value.

7. A multiple-rotor fluid torque converter of the turbine type for coupling power and load shafts under continuous variable torque comprising an impeller, a driven turbine and a plurality of one-way rotatable reactor members or stators with an auxiliary impeller member connected to rotate faster than but not slower than said impeller, the said members being equipped with blades and arranged in the stated sequence to provide a closed toroidal circulation path for a body of fluid in a working space enclosed by said members in which said blades lie; the said blades being of uniform thickness and of relatively thin-wall section, the said impeller blades having inlet and exit angles between fifteen to twenty and zero degrees respectively, the said turbine member blades having inlet and exit angles between forty to fifty and fifty to sixty degrees respectively; the said stator member blades collectively having overall inlet and exit angles between thirty-five to forty-five degrees and the said auxiliary impeller blades having inlet and exit angles between thirty-five and forty degrees, the blade angles provided yielding an optimum of shock loss during the torque multiplying drive of the converter, and permitting idling forward rotation of the said stator members and said auxiliary impeller under given low toroidal velocity of said fluid body.

8. A fluid torque converter comprising a plurality of bladed rotor elements, the bladed portions of which encompass a toroidal circulating working space for a body of fluid operative to transfer differential tongues between the adjacent bladed elements, the said space being divided into radial outflow and inflow zones, a power-connected impeller located in the outflow zone delivering said fluid body in the outer radial portions of said zones to output turbine at an approximate zero exit angle, the said turbine being immediately and adjacently located in the inflow zone; a first reaction-supporting rotor in the said inflow zone operative to receive the inflow of said body from said turbine and deliver same to a second reaction-supporting rotor located in the said outflow zone, an auxiliary impeller located in the inner radial portion of said outflow zone and arranged to receive the flow directly from said second reaction rotor and deliver same to the inlet of said first-named impeller, a one-way locking device operative to couple said impellers or to release them so that the auxiliary impeller runs forwardly faster than the first-named impeller and to lock said impellers against rotation of said auxiliary impeller reversely to that of said power-connected impeller and an arrangement of the blading portions of said rotor elements operative to generate a high toroidal velocity of said fluid body flow when a predetermined torque exists on said turbine effective to spin the said auxiliary impeller faster than the said first-named impeller.

9. In the combination set forth in claim 8, the sub-combination of the bladed portion of said first-named impeller providing flow exit at right angles to a plane separating same from the inflow zone of said turbine, and of the said turbine inflow zone being displaced rotationally forward of the outflow portion of said turbine.

10. A torque converter as defined in claim 1 in which the blades of the turbine member have exit angles between fifty and sixty degrees, the blades of the main impeller member have entry angles between fifteen and twenty degrees, the blades of the first stator member have inlet angles between thirty-five and forty degrees and exit angles between two and eight degrees and the blades of the second stator member have inlet angles between twenty and thirty degrees and exit angles between thirty-five and forty-five degrees.

11. A hydrodynamic torque converter for coupling input and output shafts at varying torque ratios, said converter having concentric bladed rotors including a main impeller, an auxiliary impeller, a turbine and two independently rotative reaction elements all forming a torus-shaped working space having inflow and outflow zones for liquid circulating at speeds varying with the ratio of the torque transmitted between the shafts, the main impeller and turbine meeting at the radially outward portion of the working space, one of said reaction elements being located in the inflow zone and adapted to be urged backward when the speed of circulation of the liquid is relatively high and to be urged forward when the speed of circulation is relatively low, a one-way brake preventing backward rotation and permitting forward rotation of said reaction element in the inflow zone, the other reaction element being located in the outflow zone and being adapted to be urged backward when the speed of circulation of the liquid is relatively high and to be urged forward when the speed of circulation is lower than the speed urging forward the first-mentioned reaction element, a one-way brake preventing backward rotation but permitting forward rotation of the second-mentioned reaction element, and a one-way clutch connecting the impellers to permit the auxiliary impeller to rotate forwardly faster than the main impeller during relatively high speed circulation, and to lock the impellers together for common rotation during relatively low speed circulation, whereby shock loss in the liquid between the reactor elements and the impellers is reduced at high circulation speeds.

12. Apparatus as defined in claim 11 in which the turbine and one reaction element are located in the inflow zone and the other reaction element and both impellers are located in the outflow zone.

References Cited in the file of this patent

UNITED STATES PATENTS

| Number | Name | Date |
|---|---|---|
| 1,636,389 | Simms | July 19, 1927 |
| 1,760,480 | Coats | May 27, 1930 |
| 1,855,967 | Jandasek | Apr. 26, 1932 |
| 1,908,627 | Moran et al. | May 9, 1933 |
| 1,965,518 | Wilson | July 3, 1934 |
| 2,142,178 | Cole et al. | Jan. 3, 1939 |
| 2,143,312 | Griswold | Jan. 10, 1939 |
| 2,186,025 | Jandasek | Jan. 9, 1940 |
| 2,196,585 | Gette | Apr. 9, 1940 |
| 2,271,919 | Jandasek | Feb. 3, 1942 |
| 2,603,943 | Evernden | July 22, 1952 |